United States Patent Office 3,456,037
Patented July 15, 1969

3,456,037
POLYURETHANE-POLYUREAS
Guenther Kurt Hoeschele, Wilmington, Del., assignor to E. I. du Pont de Nemours and Company, Wilmington, Del., a corporation of Delaware
No Drawing. Continuation of application Ser. No. 418,258, Dec. 14, 1964. This application Sept. 27, 1968, Ser. No. 767,047
Int. Cl. C08g 22/06, 41/04
U.S. Cl. 260—858                                   13 Claims

ABSTRACT OF THE DISCLOSURE

The novel polyurethane/polyurea of this invention is prepared by reacting a difunctional isocyanato-terminated component, having at least 5% of its isocyanate groups aliphatic in nature, with a difunctional amino-terminated component as herein more specifically described and claimed.

---

This application is a continuation of application Ser. No. 418,258, filed Dec. 14, 1964, now abandoned.

This invention relates to polyurethanes having improved thermal and hydrolytic stabilities and to compositions from which they are derived, which compositions have the improved characteristic of low sensitivity relative to conventional compositions to curing conditions. Some of these improved compositions are especially suited for tooling applications because of improved processing characteristics and low cure shrinkage.

It is well known to prepare polyurethane elastomers and plastics by reacting aromatic diamines with prepolymers which in turn are made by reacting an excess of an aromatic diisocyanate with a polymeric glycol. This procedure is relatively simple and convenient. It is especially useful for preparing a variety of molded items because the initial mixture of prepolymer and diamine is a liquid.

There are, however, certain disadvantages which are inherent to this preparative route for solid polyurethane compositions, including both plastics and elastomers. First, the physical properties of the compositions are relatively sensitive to curing conditions such as time, temperature and the ratio of amino groups to isocyanato groups. This sensitivity may be related to the high reactivity of the aromatic isocyanato groups contained in the required prepolymers. Second, and on occasion more serious, are the processing problems encountered in preparing very hard elastomers or plastics by the aromatic diamine/prepolymer route. In order to form tough, hard compositions, prepolymers containing high concentrations of isocyanato groups, and consequently requiring large amounts of diamine curing agent, are needed. Due to the high concentration and high reactivity of aromatic isocyanato groups, the liquid mixture of diamine and prepolymer quickly reaches a consistency which often prevents casting. This processing behavior limits the hardness which may be achieved with prior art compositions. Further, the diamine/prepolymer mixture sets to its final shape at elevated temperatures because of the exothermic nature of the reaction of amino groups with isocyanato groups. On cooling to ambient temperatures, considerable shrinkage of the cast material occurs. These deficiencies seriously limit the usefulness of polyurethanes of this type for tooling and machine part applications. A deficiency associated with the cured prior art polyurethane elastomers based entirely on aromatic isocyanates is their sensitivity to heat and moisture. While prior art elastomers are useful at elevated temperatures and in the presence of water, their physical properties may be reduced significantly by prolonged exposure.

It is an object of the present invention to provide polyurethanes and compositions from which they are derived, both having improved characteristics in the deficient aspects hereinbefore noted. Another object is to provide improved tooling compositions and a process for the preparation thereof. Other objects will appear hereinafter.

Contrary to teachings which suggest the use of highly reactive diamines when chain extending slow-reacting diisocyanates, such as in U.S. Patent No. 2,620,516 and in the same patent, of the low load bearing capacity of products derived from hexamethylene diisocyanate, and in U.S. Patent No. 3,099,642, of the poor physical properties exhibited by elastomers derived from 1,6-hexane diisocyanate (hexamethylene diisocyanate) or hexahydro-m-phenylene diisocyanate, it has been discovered that high load bearing polyurethane/polyurea plastics and elastomers having improved thermal and hydrolytic stability, among other advantages, can be obtained by reacting a difunctional isocyanato-terminated component having as its essential reacting portion isocyanato groups which are aliphatic in nature, with about an equivalent amount of a low reactivity or hindered aromatic diamine chain-extending component. Glycol residue is present by pre-reaction in at least one of these components, with the molecular weight of the glycol being sufficient to give the units between urea groups in the resultant polymer a number average molecular weight of from 250 to 2500. The reaction mixture itself has the advantage of exhibiting decreased sensitivity to variations in curing conditions and improved processability.

More particularly, the diisocyanate component need not consist solely of aliphatic diisocyanate but may contain aromatic diisocyanate as well, with the proviso that at least 5% of the free isocyanato groups present are aliphatic in nature, i.e. substituted to an aliphatic or cycloaliphatic nucleus.

The improved processing characteristics of the compositions of this invention result from the low rate of reaction of the aliphatic isocyanato groups and the slow reacting amino groups involved in their preparation. This gives longer "pot life" or working time during which the compositions may be cast and reduces the temperature reached within the compositions while they are setting up. These advantages are generally of minor importance in preparing relatively soft vulcanizates, but are extremely important in preparing very hard vulcanizates. In the past, hard polyurethane compositions generally have been obtained by adding free aromatic diisocyanates or isocyanate capped low molecular weight glycols to prepolymers derived from aromatic diisocyanates and polymeric glycols. The high reactivity of aromatic isocyanato groups imposed a practical limit on properties at about a Shore D hardness of 75 and a flexural modulus of 100,000 p.s.i. because of short pot life. In addition, the temperatures reached within such castings resulted in much shrinkage. In contrast, compositions within the present invention can be readily used to prepare castings having Shore D hardness in excess of about 85 and flexural moduli of about 300,000 to 400,000 p.s.i. At the same time, the working times of these compositions may often be measured in hours when most of the isocyanato groups are aliphatic. Shrinkage of molded parts is reduced to a minimum. When these materials are used to prepare castings of a moderate size, the temperature within the casting may remain essentially at room temperature while the composition is setting up. Preferred tooling compositions having these characteristics may be prepared (1) by reacting 4,4'-methylenebis(2-chloroaniline) with about a chemical equivalent amount of a mixture of 10–30 parts by weight of 4,4'-methylenebis(4-cyclohexyl isocyanate) and 90–70 parts by weight of a prepolymer obtained by capping 1 mole of polytetramethyleneether glycol having a molecular weight of 1000, optionally containing up to 1 mole of diethylene glycol or 1,3- or 1,4-butanediol, with about 2 moles per mole of total glycol of 2,4-tolylene diisocyanate or mixtures thereof with up to about 35% by weight 2,6-tolylene diisocyanate or (2) by reacting mixtures of 4,4'-methylenebis(2-chloroaniline) and selected diamino urethanes, prepared in turn from the bischloroformates of polytetramethyleneether glycol (1.0 mole, molecular weight about 1000) and diethylene glycol (1.5 moles) and an excess of 4,4'-methylenebis(2-chloroaniline), with about an equivalent of 4,4'-methylenebis(cyclohexyl isocyanate), optionally containing up to about 50% by weight of the tolylene diisocyanate capped prepolymers just described.

The compositions of this invention not only cure satisfactorily but are less sensitive to cure conditions than prior art compositions. The fact that satisfactory cures are obtained in a reasonable time is surprising in view of the fact that isothiocyanates which are usually considered to be equivalent in reactivity with aliphatic and cycloaliphatic isocyanates do not give satisfactory cures when reacted with a hindered diamine. The present compositions show less change in ultimate properties resulting from differences in the ratio of amino groups to isocyanato groups, cure temperature and cure time. It is believed that the decreased sensitivity to cure conditions results from the lower reactivity of aliphatic isocyanato groups. In curing prior art compositions and the compositions of this invention, it is customary to use a limited excess of the isocyanato component. As a result, free isocyanato groups are normally present to form crosslinks by secondary reactions such as that forming biuret. The degree to which secondary reactions take place depends (1) on the reactivity of the isocyanato groups available after chain extension, (2) the concentration of isocyanato groups and (3) the mixing and cure temperature. With the less reactive aliphatic isocyanato groups which are available for secondary reactions in the present compositions, the effects of isocyanato group/amino group ratio, cure temperature and cure time are much less pronounced.

The isocyanate component may consist of a simple low molecular weight diisocyanate, such as a hexamethylene diisocyanate or tolylene diisocyanate, or a reaction product of a molar excess of such an isocyanate with a glycol, it being understood that when tolylene diisocyanate or any aromatic diisocyanate is present, sufficient aliphatic or cycloaliphatic diisocyanate is also present as a compound or prepolymer to provide the 5% minimum previously described. Thus, the isocyanate component can also contain at least one prepolymer having a molecular weight of up to several thousand. A similar range of molecular weights may be employed in the case of the amine component as will be explained hereinafter. In order to form useful polyurethanes, the units between urea groups in a condensation product of one mole of each component should have a number average molecular weight in the range of 250 to 2500. To attain this molecular weight range, at least one of the components must contain a glycol residue, the molecular weight requirement for which will depend on the molecular weight of the other groups present and upon the amounts used.

Representative aliphatic diisocyanates, including cycloaliphatic diisocyanates, for use as such or in preparing reaction products, including prepolymers, with glycols include 1,4-tetramethylene diisocyanate, 1,6-hexamethylene diisocyanate, 1,3- and 1,4-cyclohexyl diisocyanates, methylenebis(4-cyclohexylisocyanate), 1,3- and 1,4-xylylene diisocyanates. Of these 1,6-hexamethylene diisocyanate and methylenebis(4-cyclohexylisocyanate) are preferred, with the latter being especially preferred for the preparation of hard compositions which are useful for tooling applications. Mixed aliphatic-aromatic diisocyanates such as 4-isocyanato-benzyl isocyanate are also of use in preparing certain compositions included by this invention. Aliphatic diisocyanates derived from inert radicals other than hydrocarbon radicals may be used in the present invention as long as the isocyanato groups are connected to aliphatic carbons. For example, compounds such as 2,2'-diisocyanato diethyl carbonate may be used.

Methylenebis(4-cyclohexylisocyanate) and its parent diamine can exist in the form of three geometrical isomers because the isocyanate (or amino) group on either cyclohexane ring can be cis or trans relative to the methylene group connecting the cyclohexane rings. These geometrical forms, namely, the trans-trans, the cis-trans and the cis-cis, are obtained in varying proportions from the hydrogenation of 4,4'-methylene dianiline. These geometrical isomers may be obtained in pure form by conventional physical separation techniques, but commercial grades of this diisocyanate normally are mixtures containing all three forms. Either pure geometrically isomers or mixtures of isomers may be used in preparing the compositions of this invention.

Any of the aromatic diisocyanates employed in preparing prior art polyurethane elastomers may be used as such or for the preparation of prepolymers as part of the isocyananate component so long as at least 5% of the free isocyanato groups present are aliphatic. Representative of these diisocyanates are tolylene-2,4-diisocyanate, tolylene-2,6-diisocyanate and mixtures thereof, methylenebis(4-phenylisocyanate) and its alkyl and alkoxy substituted derivatives and 1,3- and 1,4-phenylene diisocyanates. Ring halogenated derivatives of these aromatic diisocyanates may be of use on occasion. Tolylene diisocyanates and methylenebis(4-phenylisocyanate) are preferred. In terms of the prior art which employs prepolymers prepared from such aromatic diisocyanates and chain-extends the prepolymer with arylene diamine to form polyurethane/polyurea elastomers, the hydrolytic and thermal stability of such elastomers can be improved by adding to the prepolymer from 1 to 5 parts by weight per 100 parts of prepolymer of aliphatic or cycloaliphatic diisocyanate and having the arylene diamine having hindered amino groups as previously described.

Prepolymers which may be used as all or part of the isocyanate component are prepared by reacting an excess of a diisocyanate with a hydroxyl compound containing at least two hydroxyl groups. Either aromatic or aliphatic diisocyanates may be used so long as the minimum requirement for free aliphatic isocyanato groups is satisfied. Representative compounds of both types have been listed hereinbefore. As hydroxyl compounds, polymeric glycols, low molecular weight glycols and mixtures thereof may be used. Examples of suitable polymeric materials include polyalkyleneether glycols, and polyester glycols, with polytetramethyleneether glycol being preferred. Representative low molecular weight hydroxyl compounds include butanediol-1,3, butanediol-1,4, diethylene glycol, dipropylene glycol, neopentyl glycol, and cyclohexanediol-1,4. Since the urethanes prepared from low molecular weight glycols often are relatively high melting solids or viscous liquids, it is preferred to use them in admixture with prepolymers derived from a polymeric glycol or polyol or to employ a very large excess of diisocyanate in their preparation so that sufficient free diisocyanate remains to function as a solvent for the derivative. In preparing prepolymers of polymeric hydroxyl compounds the quantity of diisocyanate employed generally should provide at least 1.4 isocyanato groups for each hydroxyl group in order to produce a product having a low enough viscosity to be processable. Greater amounts of isocyanate may be used in preparing prepolymers. When more than 1 mole of diisocyanate is used per equivalent of hydroxyl groups, the prepolymer formed will contain significant amounts of uncombined diisocyanate.

The reaction of diisocyanates with hydroxyl compounds to form prepolymers is well known. The preparation may be accomplished by mixing the selected hydroxyl compound or compounds with an excess of diisocyanate without allowing the temperature to go above the range of about 60–100° C. Following the mixing, the reaction mass is heated until the isocyanato group content falls to an essentially constant value. Reaction times of 2–4 hours at 80° C. generally are adequate with aromatic diisocyanates. Aliphatic diisocyanates may require somewhat longer heating periods because of their lower reactivity. Prepolymer formation can be accelerated by the use of conventional organo-tin catalysts such as stannous octanoate or dibutyl tin dilaurate.

The isocyanate component may contain minor amounts of compounds which have three or more isocyanato groups. Compounds of this type may be provided by aromatic or aliphatic triisocyanates of which 1,3,5-toluene triisocyanate, 2,2',4-triisocyanatodiphenyl ether, 4,4',4''-triisocyanato-triphenylmethane and 2,2',4-triisocyanatodicyclohexylmethane are representative. Alternatively, tri- or high functionality may be provided by preparing isocyanato-urethanes from diisocyanates and triols or higher polyols. The triols or higher polyol may be low molecular weight compounds such as trimethylol ethane, trimethylol propane, glycerol, 1,2,6-hexanetriol, pentaerythritol and sorbitol or polymeric compounds such as polyalkyleneether polyols made by condensing alkylene oxides with low molecular weight polyols or polyester polyols made by usual esterification procedures in which some trifunctional polyol or carboxylic acid is included.

The diamine component must have amine groups which are substituted to an aromatic nucleus and are hindered by having positioned ortho thereto a —F, —Cl, —Br, —CF$_3$, or —NO$_2$ substituent. The molecular weight of the amine component may vary widely. The simplest diamine is a phenylene radical substituted with two amino groups and with a hindering substituent ortho to each amino group 2,4-dichloro-1,4-phenylenediamine is an example of this type compound. In general, compounds having two phenyl radicals, each having an ortho substituted amino group are more readily accessible. These compounds may be represented by the general formula

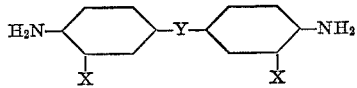

wherein X is a hindering group such as hereinbefore named and —Y— is a biradical of which —CH$_2$—, —O—, —S—, —S—S—,

lower alkylene and phenylene radicals are exemplary.

Y may also be omitted so that the phenyl radicals are joined together to yield a biphenyl derivative. In the general formula, the amino groups are shown in the para positions and while compounds having this structure are generally most readily available, the amino groups may also be positioned ortho or meta to the bond of the biradical connecting the phenyl radicals. It is not necessary that the molecule be symmetrical with reference to the positions occupied by the amino groups or the nature of the ortho substituents. The following compounds are representative of diamines of this type: 4,4'-methylenebis-(2-fluoroaniline), 3,3'-dichlorobenzidine, 4,4'-diamino-3,3'-dichlorodiphenyl ether, 4,4'-diamino-3,3'-dichlorodiphenyldisulfide, 4,4'-diamino-3-chloro - 3' - bromodiphenylmethane, 4,4' - methylenebis(2 - trifluoromethylaniline), 2,2',5-trichloro-4,4'-diaminodiphenylmethane. Of these compounds, 4,4'-methylenebis-(2-chloroaniline) is preferred.

Other substituents may be present on the aromatic nucleus or nuclei as long as they are inert toward isocyanato and amino groups. Representative of additional substituents which may be present are alkyl, aryl, alkoxy, aryloxy and alkenyl groups. More than one substituent selected from the group represented by —X may be present as long as at least one of them is ortho to the amino group. A second amino group may also be present as long as it is properly substituted. The benzene ring may be attached to the remainder of the diamine through a variety of linkages as will be described hereinafter. The benzene ring may also form a part of a fused carbocyclic ring compound in which the additional rings may be saturated or aromatic.

The following are representative of other types of low molecular weight diamines which may be used in the present compositions.

2,6-dichloro-1,5-diaminonaphthalene
2,3-dichloro-1,4-diaminonaphthalene
5,6-dichloro-4,7-diaminobenzofuran Another class of diamines which are of use in the preparation of the compositions of this invention are diaminopolyurethanes which may be used alone or in combination with diamines of the type described hereinbefore. The amino groups contained in the diaminopolyurethanes must have the same characteristics of the diamines previously discussed with reference to being aromatic and having ortho substitution. The following general formula may be used to represent the diaminopolyurethanes included in this class of amines;

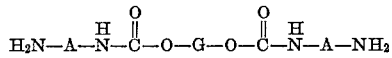

wherein —G— represents the residue or biradical resulting from removal of the hydroxyl groups from a glycol and —A— represents an inert biradical resulting from the removal of the amino groups of a diamine. The free amino group —NH$_2$ attached to biradical —A— must be aromatic and properly substituted in the ortho position. The

biradical contained in the urethane link

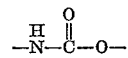

may be derived from an aromatic or aliphatic primary amino group connected to biradical —A—. There is no need for this amino group to have ortho substitution although such may be present when the diamino urethane is derived from one of the preferred symmetrical diamines disclosed hereinbefore. While the general formula illustrates a primary urethane linkage

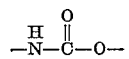

derived from a primary amine, secondary urethane linkages wherein the hydrogen attached to the nitrogen atom is replaced by a lower alkyl group may also be present.

The portion of the amino urethanes represented by —G— may range from low molecular weight radicals obtained by removing the hydroxyl groups from compounds such as butanediol-1,3, butanediol-1,4, neopentyl glycol, hexanediol-1,6, cyclohexanediol-1,4, decamethylene glycol and diethylene glycol. The radical —G— may be obtained from a polymeric glycol of which the polyethylene or polypropyleneether glycols and polyols, the polytetramethyleneether glycols, and the polyester glycols and polyols are representative. These polymeric hydroxyl compounds may have molecular weights ranging from several hundred to several thousand as long as the requirement in regard to the number average molecular weight of the units between urea groups in the condensation product of equivalent amounts of isocyanate component and diamine component is between 250 and 2500. It is not required that only one glycol be used in the form of its diaminopolyurethane. Mixtures representing combinations of low molecular weight glycols or polyols with polymeric hydroxyl compounds may be used as well as combinations of polymeric polyols having different molecular weights.

The diamino-polyurethanes are described in U.S. Patent No. 2,888,439 and can be prepared in a variety of ways. The most convenient route to these compounds involves converting the glycol or glycol mixture to be employed to its corresponding bischloroformate. Chloroformate formation may be effected by reacting the hydroxyl compound with an excess of liquid phosgene at temperatures around the boiling point of phosgene. The chloroformate so produced is converted to diamino-polyurethane by reaction with an excess of the selected diamine in the presence of an acid acceptor such as calcium hydroxide. The reaction is best performed in an inert organic solvent. Diamino-polyurethane may also be synthesized by reacting an excess of a diisocyanate with a hydroxyl compound followed by hydrolysis of the unreacted isocyanato groups in the presence of hydrochloric acid to yield amino groups. A further synthesis employs the reaction of a nitroisocyanate with a hydroxyl compound followed by catalytic hydrogenation of the dinitropolyurethane to provide the desired diamino-polyurethane. Naturally the diamines, diisocyanates or nitroisocyanates employed in these preparations must be suitably substituted to ultimately provide aromatic amino groups having ortho substituents. It should be noted that use can be made of compounds such as 2-chloro-1,4-phenylenediamine and 3-chloro-4,4'-diaminodiphenyl in preparing useful amino-urethanes via the chloroformate route. Due to the different reactivities of the amine groups in either of these illustrative compounds, urethane formation is predominantly directed to the unsubstituted amino group leaving most of the desired orthosubstituted amino groups for forming the compositions of this invention.

A minor proportion of the amino groups in the amine component may be contained in compounds having three or more amino groups. Compounds for providing tri- or higher functionability may be relatively low molecular weight triamines such as 4,4',4''-methenyl-tris(2-chloroaniline) and 3,3'-dichloro-4,4'-diamino-5-(3-chloro-4-aminobenzyl)diphenylmethane. In general higher functionality is provided more conveniently by preparing amino-urethanes from diamines and the chloroformates of polyols such as trimethylol propane and polyalkyleneether triols or polyols.

Amine components which are mixtures of diamines and diamino-polyurethanes are useful in the present invention. Preferred such mixtures consist of at least 10% by weight of the latter and at least 0.2 equivalents of arylene diamine having a $pK_b$ of at least 8.7 per equivalent of mixture; these mixtures are liquids or low melting solids.

The improved polyurethanes or more precisely polyurethane/polyureas of this invention are prepared by mixing about chemically equivalent amounts of isocyanate component and amine component and allowing the isocyanato-amino group reaction to occur. Completion of this reaction is usually accomplished at elevated temperatures. Mixing is preferably performed at the lowest temperature which provides reasonable viscosities or which melts any solid ingredients. In the case of compositions containing high concentrations of isocyanato and amino groups it is especially desirable to blend the components at the lowest temperature consistent with good mixing because of the exothermic nature of such systems at elevated temperatures. As previously indicated this is important in preparing accurate castings for use in tooling and machine part applications. Depending on the nature of the components involved and the application in question, mixing temperatures may range from about 20–120° C. with temperatures in the range of 30–100° C. being most practical in general. It should be noted that the two components may be at different temperatures prior to mixing as is usually the case when a high melting diamine curing agent is used.

The relative amounts of the two components employed in preparing the compositions of the present invention should provide about equivalent numbers of isocyanato groups and amino groups. More exactly, from about 0.7 to 1.10 amino groups should be provided for each isocyanato group, with 0.9 to 1.0 amino groups being preferred. If the number of amino groups per isocyanato group is less than 0.7 or greater than 1.10, the final compositions generally will be inferior in regard to one or more physical properties.

Actual mixing of the components may be accomplished batch-wise or continuously. When mixing is effected batchwise, either the isocyanate component may be added to the amine component or vice versa. If there is a large difference in the volume of the two components, mixing is usually best effected by adding the low volume component to the other component. The two components should be preweighed and adjusted to suitable temperatures providing a viscosity suitable for mixing before mixing is started so that the material can be brought together more or less instantaneously. Mixing may then be accomplished manually or mechanically; the latter being preferred and perhaps required as the scale of operation is increased. Once a uniform mixture has been formed, it should be poured promptly into the mold or molds to be filled.

Cure of the compositions of the present invention may be effected at elevated temperatures ranging from about 80° C. to 150° C. The time required for curing may vary from about an hour at higher temperatures on up to 1 or 2 days for temperatures below 100° C. Cure may be started almost immediately after casting is complete in the case of small castings where shrinkage is not a problem. This is especially true for compositions derived from components having relatively low concentrations of isocyanato and amino groups. As the size of castings increases and in situations where shrinkage must be minimized, it is desirable to allow the isocyanato-amino group reaction to proceed at ambient temperatures to such an extent that heating after demolding causes no distortion. The article should be demolded prior to curing to avoid undue stress due to expansion within the mold. This is particularly important in the preparation of very hard polyurethane compositions derived from components having high isocyanato and amino group concentrations. For these latter conditions and components, the fresh castings may often be allowed to stand for several days at ambient temperatures before demolding and curing at elevated temperatures. For large castings requiring close tolerances, cure is best carried out at temperatures around 100° C. for as long as a day. It should be noted that the long pot life associated with the compositions of this invention are particularly valuable in the preparation of large castings because rapid mixing becomes increasingly difficult on a large scale. With certain compositions of this invention it is possible to prepare several batches of polymer before exceeding the pot life of the first batch mixed. This provides a convenient way of preparing very large castings.

The preparation of highly accurate castings requires that cure shrinkage be minimized. This in turn requires that (1) the amine and isocyanate components be mixed at relatively low temperatures, (2) nearly all of the isocyanato groups be aliphatic and (3) the heat of reaction be allowed to flow freely from the mold. These factors minimize the temperature in the interior of the casting at the time the casting sets firmly and this in turn minimizes shrinkage. With reference to the third factor, it should be noted that cooling of the mold can be employed, but temperatures below room temperature should be used with care as extremes of temperature may set up undesirable stresses within the body of the casting. Temperatures can also be reduced by adding fillers such as finely divided steel and aluminum. Such fillers may, however, reduce the physical properties of the casting. The hard compositions of this invention also have the advantage of setting up firmly after the maximum temperature has been reached in the interior of the casting. This is important, for setting to final form while the interior temperature is still rising causes undue stresses in the casting and/or mold.

The examples which follow illustrate the preparation of a variety of isocyanate-amine reaction mixtures exhibiting advantages in processing characteristics and of their cured products exhibiting improved physical properties. Parts and percents are by weight unless otherwise indicated.

The properties of the compositions in the examples are measured in accordance with the following ASTM procedures:

Hardness—D-676
Compression set—D-395
Resilience, rebound—D-1054
Izod impact resistance—D-256 (½″ x ½″ Bar)
Tear strength—D-470
Abrasion resistance—D-394 (Method B, NBS)
Flexural modulus—D-790
Flexural yield strength—D-790

Modulus at 100% extension ($M_{100}$), modulus at 300% extension ($M_{300}$), tensile strength at break ($T_B$), percent elongation at break are measured on Scott dumbbells (ASTM D-412) with an Instron testing machine. Cross-head speeds of 1 or 20 inches/minute were used. The cross-head speed in in./min. used for each set of data is indicated by the number in parentheses following $T_B$.

Three types of methylene-bis(4-cyclohexylisocyanate) are used in certain of the examples which follow hereinafter. These are identified by their approximate trans-trans isomer content. These diisocyanates are obtained by phosgenation of diamines having the following isomer compositions:

| Isocyanate designation | Composition of corresponding diamine |
|---|---|
| 20% trans-trans | 15–17% trans-trans<br>4% cis-cis<br>76% cis-trans |
| 50% trans-trans | 50% trans-trans<br>40% cis-trans<br>8% cis-cis<br>2% ortho isomers |
| 70% trans-trans | 80% trans-trans<br>16–17% cis-trans<br>3–4% cis-cis |

Procedure A.—Bischloroformate preparation

The glycol or mixture of glycols to be converted to bischloroformates is added slowly over about a three hour period to liquid phosgene maintained under reflux in an agitated glass reactor. About 1.5–3 moles of phosgene are provided for each equivalent of hydroxyl groups contained in the glycol or glycol mixture. Following the addition, the reaction mass is allowed to agitate under reflux for an additional ½–5 hours. Excess phosgene and by-product hydrogen chloride are removed by sweeping with dry nitrogen for about 20 hours. Once most of the phosgene has been removed, the temperature of the bischloroformate approaches room temperature and remains there for the duration of this step. Following nitrogen sweeping, the material may be used for the preparation of diamino-polyurethane.

Procedure B.—Diamino-polyurethane preparation

Bischloroformate or bischloroformate mixture is added slowly with efficient agitation to an excess of diamine dissolved in benzene at temperatures below 45° C. Powdered calcium hydroxide is suspended in the diamine solution prior to the bischloroformate addition to remove hydrogen chloride as it is formed. At least 2 moles of diamine are used for each mole of bischloroformate. Calcium hydroxide is also employed in excess of the hydrogen chloride calculated to be formed by the reaction of bischloroformate with diamine. At least about 2.3 moles of calcium hydroxide should be used for each mole of bischloroformate. Following the addition of bischloroformate, the reaction mass is agitated at temperatures from 35° to 60° C. for about 1 to 10 hours to insure that the reaction goes to completion. The reaction mass is filtered to remove calcium hydroxide and insoluble salts. This filtration may be run at 40–60° C. to lower the viscosity of the reaction mass. Benzene is then removed by distillation, first at atmospheric pressure and then at reduced pressure. Final distillation conditions of 140° C. at a pressure of 10 mm. Hg are adequate for benzene removal. The residue of the distillation is the desired product.

Procedure C.—Batch mixing of isocyanate and amine components

The isocyanate and amine components are weighed prior to actual mixing. The temperatures of the separate components are adjusted as desired in order to obtain a liquid having an acceptable viscosity. Either the isocyanate or the amine component is placed in an agitated vessel of appropriate size. If there is much difference in the volumes of the components, it is usually preferred to place the components having the larger volume in the agitated vessel. The other component is added to the agitated vessel as rapidly as possible and agitation is continued until a uniform mixture is obtained. This is then poured immediately into the molds which are to be filled. If difficulty is experienced due to the formation of bubbles within castings it may be necessary to degas one or both of the components prior to mixing. This may be accomplished by heating the components to around 100° C. and agitating at reduced pressure. If low molecular weight compounds are present in the components, care must be taken to avoid their loss due to vaporization.

EXAMPLE 1

A mixture of bischloroformates is prepared from a mixture of 1 mole of polytetramethyleneether glycol having a molecular weight of about 1000 and 1 mole of butanediol-1,3 following Procedure A. Each mole of bischloroformate mixture is then reacted with 2 moles of 4,4′-methylene-bis(2-chloroaniline) following Procedure B. The diamino-polyurethane is mixed with sufficient free 4,4′-methylene-bis(2-chloroaniline) to give a mixture containing 13.2% free diamine and a overall amino nitrogen content of 3.6%. About 100 parts of this amine component at 50° C. is mixed with 36.2 parts of 50% trans-trans methylene-bis(4-cyclohexylisocyanate), also at 50° C., following Procedure C. This mixture has a pot life of 4–6 hours. The amount of amine provided corresponds to 0.95 equivalents of amino groups per equivalent of isocyanato groups. Curing of the composition is accomplished by allowing cast test slabs to stand at room temperature for 20 hours, heating at 50° C. for 16 hours and finally for 3 hours at 130° C. After aging at 25° C. and 50% relative humidity for 7 days the composition has the following physical properties:

$T_B$, p.s.i. (20) _____ 7700
$E_B$, percent _____ 60
Hardness, Shore D _____ 83
Izod impact strength, notched, ft. lb./in. _____ 4.43
NBS abrasion, percent _____ 395
Comp. set A, percent (1350 p.s.i., 70° C., 22 hrs.) 0.9
Resilience, rebound, percent _____ 32

EXAMPLE 2

The bischloroformate of polytetramethyleneether glycol having a molecular weight of about 1000 is prepared by Procedure A. A mole of the bischloroformate is reacted with 2.0 moles of 4,4′-methylene-bis(2-chloroaniline) following Procedure B. The diamino-polyurethane produced is mixed with 4,4′-methylene-bis(2-chloroaniline) to give a mixture containing 13.1% 4,4′-methylene-bis(2-chloroaniline) which corresponds to an amino nitrogen content of 2.94% for the mixture. About 100 parts of this amine component at 50° C. is mixed with 28.7 parts of 50% trans-trans methylene-bis(4-cyclohexylisocyanate), also at 50° C., following Procedure C. The amine provided corresponds to 0.97 equivalents of amino groups per equivalent of isocyanato groups. Test slabs are cast and cured for 18 hours at 130° C. After aging at 25° C. and 50% relative humidity for 7 days, the composition has the following properties:

| | |
|---|---|
| $T_B$, p.s.i. (20) | 5700 |
| $E_B$, percent | 150 |
| $M_{100}$, p.s.i. | 4600 |
| Hardness, Shore D | 66 |
| Izod impact strength, notched, ft. lb./in. | 7.37 |
| NBS abrasion, percent | 684 |
| Comp. set A, percent (1350 p.s.i., 70° C., 22 hrs.) | 15.7 |
| Resilience, rebound, percent | 52 |

EXAMPLE 3

A mixture of bischloroformates is prepared from a mixture of 4 moles of diethylene glycol and 1 mole of polytetramethyleneether glycol, molecular weight about 1000, following Procedure A. Each mole of bischloroformate mixture is reacted with 2.28 moles of 4,4′-methylene-bis(2-chloroaniline) following Procedure B. The resulting diamino-polyurethane/4,4′ - methylene - bis(2-chloroaniline) mixture contains 4.4% 4,4′-methylene-bis(2-chloroaniline) and analyzes for an amino nitrogen content of 4.1%. About 100 parts of this amine component is mixed with 42.8 parts of 50% trans-trans methylene-bis(4-cyclohexylisocyanate), both at 80° C., following Procedure C. Test slabs are cast and cured for 3 hours at 130° C. After aging at 25° C. and 50% relative humidity for 7 days, the composition has the following properties:

| | |
|---|---|
| $T_B$, p.s.i. (20) | 8,500 |
| $E_B$, percent | 10 |
| Flexural modulus, p.s.i. | 360,000 |
| Hardness, Shore D | 87 |
| Izod impact strength, notched ft. lb./in. | 1.8 |
| NBS abrasion, percent | 172.5 |
| Comp. set A, percent (1350 p.s.i., 70° C., 22 hrs.) | 1.6 |
| Resilience, rebound, percent | 33 |

EXAMPLE 4

This example illustrates the preparation of a composition containing a minor amount of a trifunctional compound.

A mixture of 1 mole of butanediol-1,3, 0.1 mole of 1,1,1-trimethylolpropane and 1 mole of polytetramethyleneether glycol, molecular weight 1000, is converted to chloroformates by Procedure A. Each equivalent of the chloroformate mixture is reacted with 1.51 moles of 4,4′-methylenebis(2-chloroaniline) following Procedure B. The resulting mixture of polyaminourethanes and 4,4′-methylene-bis(2-chloroaniline) contains 14.9% free 4,4′-methylene-bis(2-chloroaniline) and 3.9% of amino nitrogen. About 100 parts of this amine component is mixed with 38.5 parts of 50% trans-trans methylene-bis(4-cyclohexylisocyanate), both at 80° C. following Procedure C. These amounts provide 0.95 equivalents of amino groups per equivalent of isocyanato groups. Test slabs are cast and cured for 3 hours at 130° C.

After aging 7 days at 25° C. and 50% relative humidity, the composition has the following properties:

| | |
|---|---|
| $T_B$, p.s.i. (20) | 8,500 |
| $E_B$, percent | 30 |
| Flexural modulus, p.s.i. | 255,000 |
| Hardness, Shore D | 85 |
| Izod impact strength, notched, ft. lb./in. | 2.26 |
| NBS abrasion, percent | 176.2 |
| Comp. set A, percent (1350 p.s.i., 70° C., 22 hrs.) | 2.9 |
| Resilience, rebound, percent | 55 |

EXAMPLE 5

An isocyanate component is prepared by mixing 15 parts of 70% trans-trans methylene-bis (4-cyclohexylisocyanate) with 100 parts of a prepolymer prepared by reacting 1 mole of polytetramethyleneether glycol (1000 molecular weight) and 2 moles of 2,4-tolylene diisocyanate for 4 hours at 80° C. This mixture is mixed with 32 parts of 4,4′-methylene-bis(2-chloroaniline) at 80° C. by Procedure C and cured for 6 hours at 100° C. After aging 7 days at 25° C. and 50% relative humidity, the composition has the following properties:

| | |
|---|---|
| $T_B$, p.s.i. (20) | 5700 |
| $E_B$, percent | 220 |
| $M_{100}$, p.s.i. | 3800 |
| Comp. set A (22 hrs. at 70° C., 1350 p.s.i.), percent | 16.4 |
| Resilience, percent | 57 |
| Tear strength, p.l.i. | 150 |
| Hardness, Shore D | 70 |
| Abrasion resistance, percent | 339 |

EXAMPLE 6

A polyester glycol prepared from a dibasic acid mixture consisting of glutaric acid (50% by weight), adipic acid (25% by weight) and succinic acid (25% by weight) and diethylene glycol, number average molecular weight 694, is converted to the corresponding bischloroformate by Procedure A. About 1 mole of bischloroformate is reacted with 2.7 moles of 4,4′-methylene-bis(2-chloroaniline) by Procedure B yielding an amine component containing 16.4% 4,4′ - methylene-bis(2-chloroaniline) and 3.45% amino nitrogen. About 100 parts of this amine component at 80° C. is mixed with 33.4 parts of 50% trans-trans methylene-bis(4-cyclohexylisocyanate), also at 80° C., following Procedure C. These amounts provide 0.95 equivalents of amino groups per equivalent of isocyanato groups. Test slabs are cast and cured for 3.5 hours at 130° C. After aging at 25° C. and 50% relative humidity, the composition has the following properties:

| | |
|---|---|
| $T_B$, p.s.i. (20) | 8,200 |
| $E_B$, percent | 60 |
| Flexural modulus, p.s.i. | 200,000 |
| Hardness, Shore D | 84 |
| Izod impact strength, notched, ft. lb./in. | 2.05 |
| NBS abrasion, percent | 286 |
| Comp. set A, percent (1350 p.s.i., 70° C., 22 hrs.) | 4.2 |
| Resilience, rebound, percent | 49 |

EXAMPLE 7

Polypropyleneether glycol, molecular weight 425, is converted to the corresponding bischloroformate by Procedure A. About 1 mole of this bischloroformate is reacted with 2.36 moles of 4,4′-methylene-bis(2-chloroaniline) using the process of Procdure B. The diamino-polyurethane produced contains 7.75% of 4,4′-methylene-bis (2-chloroaniline) and has an amino nitrogen content of 3.35%. About 100 parts of this amine component is reacted with 36.5 parts of 50% trans-trans methylene-bis (4-cyclohexylisocyanate), both at 80° C., following Procedure C. Test slabs are cast and cured for 3 hours at 130°

C. After aging at 25° C. and 50% relative humidity for 7 days, the composition has the following properties:

| | |
|---|---|
| $T_B$, p.s.i. (20) | 7,650 |
| $E_B$, percent | 20 |
| Flexural modulus, p.s.i. | 440,000 |
| Hardness, Shore D | 87 |
| Izod impact strength, notched, ft. lb./in. | 1.69 |
| NBS abrasion, percent | 167 |
| Comp. set A, percent (1350 p.s.i., 70° C., 22 hrs.) | 7.5 |
| Resilience, rebound, percent | 49 |

EXAMPLE 8

Polytetramethyleneether glycol, number average molecular weight 1000, is converted to its bischloroformate according to Procedure A. The bischloroformate, 1 mole, is reacted wtih 2.0 moles of 4-chloro-1,3-phenylenediamine following Procedure B. Due to the higher reactivity of the 1-amino group contained in the phenylenediamine, the diamino-polyurethane produced has predominantly amino groups having ortho chloro-substitution. 4,4'-methylene-bis(2-chloroaniline) is added to the diaminourethane to give an amine component containing 25% of uncombined 4,4'-methylene-bis(2-chloroaniline) and 4.2% amino nitrogen. About 100 parts of this amine component is reacted at 50° C. with 42 parts of 20% trans-trans methylene-bis(4-cyclohexylisocyanate) following Procedure C. Slabs are cast and are cured for 24 hours at 100° C. followed by 24 hours at 121° C. After aging for 7 days at 25° C. and 50% relative humidity, the composition has the following properties:

| | |
|---|---|
| $T_B$, p.s.i. (1) | 6,000 |
| $E_B$, percent | 90 |
| Flexural modulus, p.s.i. | 154,000 |
| Flexural yield strength, p.s.i. | 9,070 |
| Hardness, Shore D | 78 |
| Izod impact strength, notched, ft. lb./in. | 7.65 |
| Comp. set A, percent (1350 p.s.i., 70° C., 22 hrs.) | 6.6 |

EXAMPLE 9

This example illustrates the preparation of a composition from an aliphatic diisocyanate prepolymer.

A prepolymer is prepared by reacting 1 mole of polytetramethyleneether glycol, molecular weight about 1000, with 3 moles of 50% trans-trans methylene-bis(4-cyclohexylisocyanate) at 80° C. for 2 hours under a nitrogen atmosphere in the presence of 0.5 gram of succinyl chloride. About 100 parts of the resulting prepolymer at 80° C. is mixed with 29.4 parts of 4,4'-methylene-bis(2-chloroaniline) at 80° C. following Procedure C.

These amounts correspond to 0.95 equivalents of amino groups per equivalent of isocyanato groups. Slabs are cast and cured for 11 hours at 100° C. After aging 7 days at 25° C. and 50% relative humidity, the composition has the the following properties:

| | |
|---|---|
| $T_B$, p.s.i. (20) | 5900 |
| $E_B$, percent | 160 |
| $M_{100}$, p.s.i. | 4800 |
| Hardness, Shore D | 72 |
| Izod impact strength, notched, ft. lb./in. | 7.4 |
| NBS abrasion, percent | 273 |
| Comp. set A, percent (1350 p.s.i., 70° C., 22 hrs.) | 23.3 |
| D-470 tear strength, p.l.i. | 60 |
| Resilience, rebound, percent | 50 |

EXAMPLE 10

A mixture of 1.5 moles of diethylene glycol and 1 mole of polytetramethyleneether glycol, number average molecular weight 1000, is converted to the corresponding bischloroformates by Procedure A. This mixture is converted to a diamino-polyurethane by reacting 3.0 moles of 4,4'-methylene-bis(2-chloroaniline) with each mole of bischloroformate mixture by the directions of Procedure B. By adding additional 4,4'-methylene-bis(2-chloroaniline) to the diamino-polyurethane, 2 amine components, designated 10-A and 10-B, are prepared. These components have the following compositions:

| Amine component | 10-A | 10-B |
|---|---|---|
| Free 4,4'-methylene-bis(2-chloroaniline), percent | 24.2 | 47.8 |
| Amine Nitrogen, percent | 4.43 | 6.3 |

About 100 parts of amine component 10-A is reacted with a mixture of 40 parts 50% trans-trans methylene-bis(4-cyclohexylisocyanate) and 18.8 parts of a prepolymer prepared by reacting 1 mole of polytetramethyleneether glycol, molecular weight 1000, with 2 moles of tolylene-2,4-diisocyanate for 3 hours at 80° C. Of the isocyanato groups present in the isocyanate component, 91.5% are aliphatic. The reaction between the amine component and the mixed isocyanate component is performed at 50° C. following Procedure C. Slabs are cast and cured at room temperature for 48 hours followed by 20 hours at 100° C.

In a similar manner, 100 parts of amine component 10-B is reacted with a mixture of 48 parts of 50% trans-trans methylene-bis(4-cyclohexylisocyanate) and 76.6 parts of the prepolymer described in the preceding paragraph. This isocyanate component contains 76.2% aliphatic isocyanato groups. The components are mixed at 50° C. following Procedure C; slabs are cast and cured for 20 hours at room temperature and 20 hours at 100° C.

Both compositions are prepared using 0.95 equivalents of amino groups per equivalent of isocyanato groups.

The compositions have the following properties after aging for 7 days at 25° C. and 50% relative humidity. The compositions are referred to by the designations employed for identification of the amine components used in their preparation.

| | Composition | |
|---|---|---|
| | 10-A | 10-B |
| $T_B$, p.s.i. (1) | 7,900 | 6,500 |
| $E_B$, Percent | 80 | 100 |
| Flexural Modulus, p.s.i. | 261,000 | 220,000 |
| Flexural Yield Strength, p.s.i. | 13,000 | 11,500 |
| Hardness, Shore D | 84 | 82 |
| Izod Impact Strength, notched, ft. lb./in. | 2.25 | 3.2 |
| NBS Abrasion, Percent | 573 | 789 |

When 100 parts of amine component 10-B is reacted with an isocyanate component consisting of a mixture of 30.4 parts hexamethylene diisocyanate and 76.6 parts of the prepolymer used previously in this example, a composition having the following properties is obtained. Reaction is performed by Procedure C at 50° C. with 20 hours of cure at room temperature and 24 hours at 100° C. The composition is aged for 7 days at 25° C. and 50% relative humidity before testing.

| | |
|---|---|
| $T_B$, p.s.i. (1) | 5,800 |
| $E_B$, percent | 160 |
| Flexural modulus, p.s.i. | 123,000 |
| Flexural yield strength, p.s.i. | 6,300 |
| Hardness, Shore D | 76 |
| Izod impact strength, notched, ft. lb./in. | 3.0 |
| NBS abrasion, percent | 411 |
| Comp. set A, percent (1350 p.s.i., 70° C., 22 hrs.) | 39.3 |

EXAMPLE 11

A mixture of 1 mole of diethylene glycol and 1 mole of polytetramethyleneether glycol, number average molecular weight 1000, is converted to the corresponding bischloroformates by Procedure A. This mixture is converted to diamino-polyurethanes by reacting 3.2 moles of 4,4'-methylene-bis(2-chloroaniline) with each mole of bischloroformate mixture by the directions of Procedure B yielding an amine component having 26.8% free 4,4'-methylene-bis(2-chloroaniline) and 4.2% amino nitrogen. Following Procedure C, 100 parts of this amine component is mixed with an isocyanate component prepared by mixing 37.0 parts of 50% trans-trans methylene-bis(4-cyclohexyliso-cyanate) and 25.2 parts of a prepolymer resulting from the reaction of 4 moles of a mixture of isomeric tolylene diisocyanates (80%, 2,4-isomer; 20% 2,6-isomer) with a mixture of 1 mole of butanediol-1,3 and 1 mole of polytetramethyleneether glycol, number average molecular weight about 1000. This isocyanate component contains about 88.6% aliphatic isocyanato groups. Slabs and bars for test purposes are cast and cured for 24 hours at room temperature and 20 hours at 100° C.

A similar composition is prepared in which the 50% trans-trans methylene-bis(4-cyclohexylisocyanate) is replaced with an equal weight of 20% trans-trans methylene-bis(4-cyclohexylisocyanate). The procedures in preparing this composition are identical to those used above with the exception that the composition is cured for 48 hours at room temperature and 16 hours at 100° C.

After aging for 7 days at 25° C. and 50% relative humidity, the two compositions have the following properties:

|  | Composition Based On— | |
|---|---|---|
|  | 50% Trans-Trans | 20% Trans-Trans |
| $T_B$, p.s.i. (20) | 8,400 | 7,700 |
| $E_B$, Percent | 60 | 60 |
| Flexural Modulus, p.s.i. | 250,000 | 231,000 |
| Flexural Yield Strength, p.s.i. | 11,000 | 12,400 |
| Hardness, Shore D | 83 | 83 |
| Izod Impact Strength, notched, ft. lb./in. | 3.9 | 3.8 |
| NBS Abrasion, Percent | 368 | 458 |

EXAMPLE 12

A mixture of 2.0 moles of diethylene glycol and 1.0 mole of polytetramethyleneether glycol, number average molecular weight about 1000, is converted to the corresponding bischloroformates by Procedure A. The bischloroformates are converted to diamino-polyurethanes by reacting 2.7 moles of 3,3' - dichlorobenzidine with each mole of bischloroformate mixture by Procedure B. The resulting product contains 15.4% free 3,3' - dichlorobenzidine and 4.45% amino nitrogen. This amine component is used to prepare two compositions, 12–A and 12–B.

Composition 12–A is prepared, via Procedure C, by reacting about 100 parts of amine component with an isocyanate component obtained by mixing 39.6 parts of 50% trans-trans methylene-bis(4-cyclohexylisocyanate) and 26.5 parts of a prepolymer which in turn is prepared by reacting 4 moles of tolylene diisocyanate (80% 2,4-isomer; 20% 2,6-isomer) with a glycol mixture of 1 mole of butanediol-1,3 and 1 mole of polytetramethyleneether glycol, number average molecular weight 1000. Curing of cast test pieces is accomplished by holding at room temperature for 24 hours, followed by 20 hours at 100° C.

Composition 12–B is prepared, via Procedure C, by reacting about 100 parts of the above amine component with an isocyanate component obtained by mixing 39.6 parts of 20% trans-trans methylene-bis(4-cyclohexylisocyanate) and 39.4 parts of a prepolymer which in turn is prepared by reacting 2 moles of tolylene-2,4-diisocyanate with 1 mole of polytetramethyleneether glycol, number average molecular weight 1000. Curing is performed for 24 hours at room temperature and 24 hours at 100° C.

After aging for 7 days at 25° C. and 50% relative humidity, Compositions 12–A and 12–B have the following physical properties:

|  | Composition | |
|---|---|---|
|  | 12–A | 12–B |
| $T_B$, p.s.i. (20) | 5,800 | 6,600 |
| $E_B$, Percent | 10 | 140 |
| Flexural Modulus, p.s.i. | 315,000 | 215,000 |
| Hardness, Shore D | 84 | 80 |
| Izod Impact Strength, notched, ft. lb./in. | 0.22 | 1.16 |
| NBS Abrasion, Percent |  | 544 |

EXAMPLE 13

A mixture of 1.5 moles of diethylene glycol and 1.0 mole of polytetramethyleneether glycol, number average molecular weight of 1000, is converted to the corresponding bischloroformates by Procedure A. Following Procedure B, the bischloroformates are converted to diamino-polyurethanes by reacting 3.05 moles of 4,4'-methylene-bis(2-fluoroaniline) with each mole of bischloroformate. By adding additional 4,4' - methylene-bis(2 - fluoroaniline) to the diamino-polyurethanes an amine component containing 36.7% free 4,4'-methylene-bis(2-fluoroaniline) and 8.0% amino nitrogen is prepared.

About 100 parts of this amine component is mixed with an isocyanate component obtained by mixing 48.0 parts of 20% trans-trans methylene-bis(4-cyclohexylisocyanate) and 76.8 parts of a prepolymer which in turn is prepared by reacting 2 moles of tolylene-2,4-diisocyanate with 1 mole of polytetramethyleneether glycol, number average molecular weight of 1000. Mixing is effected at 50° C. following Procedure C. The amounts employed supply 0.96 amino group for each isocyanato group. Curing of cast test pieces is accomplished by holding at room temperature for 24 hours. The composition after aging for 7 days at 25° C. and 50% relative humidity has the following properties:

| | |
|---|---|
| $T_B$, p.s.i. (1) | 6900 |
| $M_{100}$, p.s.i. | 5750 |
| $E_B$, percent | 140 |
| Hardness, Shore D | 80 |
| Flexural modulus, p.s.i. | 192,000 |
| Flexural yield strength, p.s.i. | 9800 |
| Izod impact strength, notched, ft. lb./in. | 5.0 |
| NBS abrasion, percent | 1087 |

The required 4,4' - methylene-bis(2 - fluoroaniline) may be prepared by the usual aniline-formaldehyde condensation for preparing methylene dianiline. The material used in this example is prepared by adding at room temperature a mole of 37% formaldehyde to an aqueous solution of two moles of the acid sulfate of 2-fluoroaniline, heating to about 90° C. to rearrange the initial condensation product, neutralizing the acid and separating the organic material. The crude diamine is purified by distillation at reduced pressure yielding a colorless product melting at 65–67° C.

EXAMPLE 14

A mixture of 1.0 mole of butanediol-1,3 and 1.0 mole of polytetramethyleneether glycol, number average molecular weight of 1000, is converted to the corresponding bischloroformates by Procedure A. The bischloroformates are converted to diamino-polyurethanes, via Procedure B, by reacting 2.63 moles of 4,4'-methylene-bis-(2-chloroaniline) with each mole of bischloroformate. The amine component, so produced, contains 13.4% free 4,4' - methylene-bis(2 - chloroaniline) and 3.6% amino nitrogen. About 100 parts of amine component are mixed with an isocyanate component prepared by mixing 25.4 parts of 50% trans-trans methylene-bis(4-cyclohexylisocyanate) and 7.1 parts of tolylene diisocyanate isomers (80% 24-isomer; 20% 2,6-isomer). The components are mixed at 50° C. using Procedure C. The amounts used provide 0.95 amino group for each isocyanato group. Cast test pieces are cured for 3 hours at 130° C. After aging for 7 days at 25° C. and 50% relative humidity, the composition has the following properties:

| | |
|---|---|
| $T_B$, p.s.i. (20) | 7500 |
| $E_B$, percent | 60 |
| Hardness, Shore D | 84 |
| Izod impact strength, notched, ft. lb./in. | 2.87 |
| NBS abrasion, percent | 223 |
| Comp. set A, percent (1350 p.s.i., 70° C., 22 hrs.) | 1.5 |
| Resilience, rebound, percent | 30 |

EXAMPLE 15

This example demonstrates the improved processing and hydrolytic stability of relatively hard compositions of this invention in comparison with similar prior art compositions.

A prepolymer is prepared by reacting 2 moles of 2,4-tolylene diisocyanate with one mole of polytetramethyleneether glycol (number average molecular weight about 1000) for 4 hours at 80° C. under nitrogen.

Composition 15–A, which is representative of prior art compositions, is prepared by mixing 100 parts of this prepolymer with 10 parts of 2,4-tolylene diisocyanate to form an isocyanate component which is mixed and reacted with 33.3 parts of 4,4'-methylene-bis(2-chloroaniline) following Procedure C. Mixing is effected at 70° C. and the composition is cured for 3 hours at 100° C. The pot life observed during the preparation of this composition is about 1 minute.

Composition 15–B, within the present invention, is prepared from an isocyanate component obtained by mixing 100 parts of the same prepolymer with 15 parts of 50% trans-trans methylene-bis(4-cyclohexylisocyanate) and an amine component amounting to 33.7 parts of 4,4'-methylenebis(2-chloroaniline). Mixing of the components is effected at 80° C. following Procedure C. The composition is cured for 5 hours at 100° C. In contrast to Composition 15–A, Composition 15–B has a pot life of 6 minutes.

After aging for 7 days at 25° C. and 50% relative humidity these compositions exhibit the following properties:

|  | 15–A | 15–B |
|---|---|---|
| $T_B$, p.s.i. (20) | 5,300 | 6,500 |
| $E_B$, Percent | 230 | 260 |
| $M_{100}$, p.s.i. | 3,270 | 3,750 |
| Tear Strength, ASTM D470, p.l.i. | 117 | 120 |
| Hardness, Shore D | 64 | 72 |
| Izod Impact Strength, notched, ft. lb./in. | 20 | 20 |

Samples of these compositions are placed in water at 98–100° C. for 16 hours and then allowed to stand for 3 days at 25° C. and 50% relative humidity. After this exposure, the compositions have the following properties:

|  | 15–A | 15–B |
|---|---|---|
| $T_B$, p.s.i. (20) | 4,800 | 5,800 |
| $E_B$, Percent | 400 | 240 |
| $M_{100}$, p.s.i. | 2,300 | 3,600 |
| Tear Strength, ASTM D470, p.l.i. | 175 | 125 |
| Hardness, Shore D | 55 | 72 |

The properties of Composition 15–B are not significantly different after exposure, while prior art Composition 15–A decreases markedly in modulus and hardness.

A composition having essentially the same properties of Composition 15–B is prepared from an isocyanate component made by heating a mixture of 82.4 parts of polytetramethyleneether glycol (molecular weight 950), 30 parts of 2,4-tolylene diisocyanate and 16.85 parts of 4,4'-methylene-bis(4-cyclohexylisocyanate) for 2 hours at 80° C. under nitrogen. About 100 parts of this component is mixed at 80° C. and 28.3 parts of 4,4'-methylene-bis(2-chloroaniline) following Procedure C. This composition contains the same ingredients in the same proportions as Compositions 15–B and has essentially the same pot life and physical properties as Composition 15–B. It is included as illustrating a second route for preparing isocyanate components of the type required for Composition 15–B.

EXAMPLE 16

This example illustrates the improved hydrolytic and thermal stability of medium hard compositions of the present invention.

A prepolymer is prepared by reacting 1.6 moles of 2,4-tolylene diisocyanate with 1.0 moles of polytetramethyleneether glycol (number average molecular weight about 1000) for 4 hours at 80° C. under nitrogen. The product contains about 4.2% free isocyanato groups. This prepolymer is used as the isocyanate component for preparing a control composition, 16–A, which is representative of the prior art. The isocyanate component for a second control, Composition 16–B, is prepared by adding 3.33 parts of 2,4-tolylene diisocyanate to 100 parts of the above prepolymer.

A series of 4 isocyanate components for the preparation of Compositions 16–C, 16–D, 16–E and 16–F, all within the scope of the present invention, is prepared by adding 4.3 parts of 1,10-decamethylene diisocyanate, 3.2 parts of trans-1,4-cyclohexane diisocyanate, 4.7 parts of $\alpha,\alpha,\alpha',\alpha'$-tetramethyl-1,3-xylylene diisocyanate and 5.0 parts of 50% trans-trans methylene-bis(4-cyclohexylisocyanate) to 100 part portions of the prepolymer previously described in this example.

Each of the six isocyanate components is converted to a cured composition by mixing at 100° C. with 95% of the 4,4'-methylene-bis(2-chloroaniline) required by theory to react with all of the isocyanato groups present. In the case of Composition 16–A, 12.55 parts of diamine are used for 100 parts of prepolymer. For compositions 16–B through 16–F, about 17.4 parts of diamine are used for the isocyanate components prepared by adding additional diisocyanate in the amounts stated above to 100 parts of prepolymer. Compositions 16–A and 16–B, which contain only aromatic isocyanato groups are cured for 3 hours at 100° C. Compositions 16–C through 16–F are cured for 7 hours at 100° C.

The original physical properties of the six compositions are as follows after aging for 7 days at 25° C. and 50% relative humidity.

|  | Composition | | | | | |
|---|---|---|---|---|---|---|
|  | 16–A | 16–B | 16–C | 16–D | 16–E | 16–F |
| $T_B$, p.s.i., (20) | 6,000 | 6,000 | 5,100 | 4,900 | 3,000 | 5,000 |
| $E_B$, percent | 440 | 450 | 470 | 450 | 560 | 420 |
| $M_{100}$, p.s.i. | 1,100 | 1,350 | 1,075 | 1,300 | 900 | 1,170 |
| $M_{300}$, p.s.i. | 2,100 | 2,450 | 1,810 | 2,330 | 1,420 | 2,370 |
| $S_B$, Percent | 4 | 4 | 3 | 4 | 9 | 2 |
| Split Tear, ASTM D470, p.l.i. | 68 | 114 | 87 | 88 | 106 | 114 |
| Hardness, Shore A | 91 | 94 | 91 | 94 | 91 | 93 |

Samples of Compositions 16–A, 16–B, 16–C and 16–D are placed in water at 98–99° C. for 16 hours. After aging for 3 days at 25° C. and 50% relative humidity, the compositions exhibit the following properties:

|  | Composition | | | |
|---|---|---|---|---|
|  | 16–A | 16–B | 16–C | 16–D |
| $T_B$, p.s.i. (20) | 2,600 | 3,200 | 4,000 | 5,900 |
| $E_B$, Percent | 740 | 560 | 500 | 520 |
| $M_{100}$, p.s.i. | 810 | 1,175 | 960 | 1,250 |
| $M_{300}$, p.s.i. | 1,100 | 1,700 | 1,570 | 1,950 |
| $S_B$, Percent | 34 | 13 | 5 | 5 |
| Split Tear, ASTM D470, p.l.i. | 100 | 135 | 100 | 120 |
| Hardness, Shore A | 38 | 93 | 88 | 93 |

The prior art Compositions 16–A and 16–B show large decreases in tensile strength and 300% modulus and large increases in set at break. The compositions of this invention, 16–C and 16–D, show only minor changes in any property.

Samples of Compositions 16–A, 16–B, 16–E, and 16–F are held at 121° C. for 7 days. After aging for 3 days at 25° C. and 50% relative humidity, the compositions have the following properties:

|  | Composition | | | |
| --- | --- | --- | --- | --- |
|  | 16–A | 16–B | 16–E | 16–F |
| $T_B$, p.s.i. (20) | 3,300 | 3,600 | 2,850 | 5,000 |
| $E_B$, percent | 600 | 590 | 690 | 480 |
| $M_{100}$, p.s.i | 1,000 | 1,250 | 1,030 | 1,280 |
| $M_{300}$, p.s.i | 1,425 | 1,700 | 1,400 | 2,150 |
| $S_B$, percent | 11 | 13 | 10 | 4 |
| Split Tear, ASTM D470, p.l.i | 115 | 135 | 135 | 130 |
| Hardness, Shore A | 90 | 93 | 92 | 94 |

Samples 16–C and 16–D illustrate the improved heat aging characteristics of the present compositions relative to prior art Compositions 16–A and 16–B.

EXAMPLE 17

This example illustrates the improved hydrolytic stability of a composition of this invention having relatively low hardness. It is compared with a similar prior art composition which differs in that it contains only aromatic isocyanato groups.

A prepolymer is prepared by adding in order 0.9 mole of polypropyleneether glycol (molecular weight 2000) and 0.7 mole of polytetramethyleneether glycol (molecular weight 2000) to 5.4 moles of a mixture of tolylene diisocyanate isomers (80% 2,4-isomer; 20% 2,6-isomer). The addition is made as rapidly as possible without exceeding a temperature of 80° C. A further addition of 1.4 moles of 2000 molecular weight polytetramethyleneether glycol is made over a 2 hour period, following the first additions. During this addition, the temperature is maintained at 75 to 80° C. Following this addition the mixture is maintained at 78 to 80° C. for 6 hours.

To 100 part portions of this prepolymer are added 1 part of methylene-bis(4-phenylisocyanate) and 1 part of 50% trans-trans methylene-bis(4-cyclohexylisocyanate) so as to prepare two isocyanate components, 17–A and 17–B. These are mixed at 100° C. and reacted with 9.6 part portions of 4,4′-methylene-bis(2-chloroaniline). Composition 17–A is cured for 3 hrs. at 100° C. Composition 17–B, containing methylene-bis(4-cyclohexylisocyanate), is cured for 1 hour at 100° C. and 2 hours at 120° C.

The original properties of these materials are measured after aging for 7 days at 25° C. and 50% relative humidity. Samples of these materials are placed in water at 98 to 99° C. for 16 hours and then aged for 3 days at 25° C. and 50% relative humidity and properties are again determined. The original properties and those after exposure to water are as follows:

|  | Original | | After Exposure | |
| --- | --- | --- | --- | --- |
|  | 17–A | 17–B | 17–A | 17–B |
| $T_B$, p.s.i. (20) | 3,050 | 3,100 | 1,750 | 2,800 |
| $E_B$, percent | 600 | 690 | 1,000 | 720 |
| $M_{100}$, p.s.i | 570 | 450 | 350 | 430 |
| $M_{300}$, p.s.i | 970 | 750 | 490 | 690 |
| $S_B$, percent | 8 | 11 | 84 | 14 |
| Hardness, Shore A | 82 | 79 | 75 | 77 |
| Compression Set B, percent | 31 | 40 | 70 | 43 |
| Split Tear, ASTM D470, p.l.i | 62 | 64 | 63 | 67 |

The original properties of Composition 17–A and 17–B are quite similar; however, after exposure to water, 17–A, the prior art polymer, shows large decreases in tensile strength and 300% modulus and large increases in set at break and compression. The properties of the composition of this invention, 17–B, change only slightly as a result of exposure to hot water.

EXAMPLE 18

This example illustrates the decreased sensitivity of the compositions of this invention to variations in cure conditions as reflected by physical properties.

A series of four prior art compositions (18–A–18–D) differing only in the use of two levels of diamine curing agent (90 and 95% of theory) and two curing temperatures (100° C. and 120° C.) are prepared from the materials tabulated in Table 18–I. In addition, a similar series of four compositions (18–E–18–H) falling within the present invention are prepared. Materials and amounts are also presented in Table 18–I as well as physical properties for all eight compositions.

TABLE 18-I.—EFFECT OF VULCANIZATE PROPERTIES CURING CONDITIONS

| Prepolymer,[a] pts | 100 | 100 | 100 | 100 | 100 | 100 | 100 | 100 |
| --- | --- | --- | --- | --- | --- | --- | --- | --- |
| 50% trans-trans methylene-bis-(4-cyclohexylisocyanate) |  |  |  |  | 2.0 | 2.0 | 2.0 | 2.0 |
| Diamine,[b] pts | 11.75 | 11.75 | 12.55 | 12.55 | 13.68 | 13.68 | 14.45 | 14.45 |
| Diamine,[b] percent of theory | 90 | 90 | 95 | 95 | 90 | 90 | 95 | 95 |
| Mixing Temp., ° C | 100 | 100 | 100 | 100 | 100 | 100 | 100 | 100 |
| Cure temperature, ° C | 100 | 120 | 100 | 120 | 100 | 120 | 100 | 120 |
| Cure time, hrs | 3 | 3 | 3 | 3 | 6 | 3 | 6 | 3 |
| $M_{300}$, p.s.i | 1,950 | 1,850 | 1,650 | 1,475 | 1,870 | 1,960 | 1,890 | 1,800 |
| Hardness, Durometer-A | 92 | 87 | 90 | 87 | 92 | 90 | 92 | 90 |

[a] Reaction product of 1.6 moles of 2,4-tolylene diisocyanate and 1.0 moles of polytetramethyleneether glycol, molecular weight, 1,000.

[b] 4,4′-methylene-bis(2-chloroaniline).

The advantages of the present compositions may be seen more clearly when the differences in modulus and hardness produced by the various changes in cure conditions are tabulated as in Table 18–II.

|  | Compositions | |
| --- | --- | --- |
|  | Prior Art | Present |
| Change in $M_{300}$, p.s.i. when— |  |  |
| Cure temp. is increased at 90% diamine | −100 | +90 |
| Cure temp. is increased at 95% diamine | −200 | −90 |
| Diamine is increased at 100° C. cure | −300 | +20 |
| Diamine is increased at 120° C. cure | −375 | −160 |
| Change in Hardness, Durometer A Units when— |  |  |
| Cure temp. is increased at 90% diamine | −5 | −2 |
| Cure temp. is increased at 95% diamine | −3 | −2 |
| Diamine is increased at 100° C. cure | −2 | 0 |
| Diamine is increased at 120° C. cure | 0 | 0 |

EXAMPLE 19

This example illustrates the preparation of hard compositions within the present invention which are obtained by adding aliphatic diisocyanate to a prior art prepolymer.

The prior art prepolymer is prepared by reacting about 4 moles of a mixture of tolylene diisocyanate isomers (80% 2,4-isomer; 20% 2,6-isomer) with a mixture of 1 mole of butanediol-1,3 and 1 mole of polytetramethylene-ether glycol for 4 hours at 80° C. under nitrogen.

A series of three compositions, one of which is a control, is prepared from this prepolymer using ingredients in the amounts tabulated as follows:

|  | Composition | | |
| --- | --- | --- | --- |
|  | 19-A | 19-B | 19-C |
| Isocyanate Component: | | | |
| Prepolymer, parts | 100 | 100 | 100 |
| 50% trans-trans methylene-bis(4-cyclohexylisocyanate), parts | | 10.5 | 20.7 |
| Amine Component: 4,4'-methylene-bis(2-chloroaniline), parts | 28.2 | 38.2 | 48.0 |

The isocyanate and amine components are combined by Procedure C at a mixing temperature of 70° C. Composition 19-A, the control, has a pot life of only 1 minute. It is cured at 100° C. for 1 hour. Compositions 19-B and 19-C have pot lives of 1.5 and 2.0 minutes respectively in spite of their higher total isocyanato group content. These compositions are cured for 6 hours at 100° C.

After aging for 7 days at 25° C. and 50% relative humidity the three compositions have the following properties:

|  | Composition | | |
| --- | --- | --- | --- |
|  | 19-A | 19-B | 19-C |
| $T_B$, p.s.i., (20) | 5,700 | 6,300 | 8,500 |
| $E_B$, percent | 140 | 100 | 80 |
| $M_{100}$, p.s.i. | 5,200 | 6,300 | |
| Split Tear, ASTM D470, p.l.i. | 110 | 90 | 90 |
| Hardness, Shore D | 75 | 83 | 85 |
| Compression Set A (22 hrs., 70° C., 1350 p.s.i.) | 9 | 5.6 | 2.8 |

These compositions of the present invention are harder than those previously attainable under practical conditions with prior art prepolymers based exclusively on aromatic diisocyanates. At the same time, the present compositions have better processing characteristics as indicated by increased pot life.

EXAMPLE 20

This example illustrates the preparation of hard compositions from isocyanate components obtained by adding aliphatic diisocyanate to conventional polyester prepolymers.

The required polyester prepolymers are prepared as follows:

Prepolymer A

A polyester is prepared by heating a mixture of 2740 parts of glutaric anhydride, 1565 parts of adipic acid, 1565 parts of succinic acid and 4420 parts of ethylene glycol for about 14 hours under nitrogen until 2214 parts of distillate containing water and ethylene glycol is collected. The final pot temperature reached is 250° C. The resulting polyester has a hydroxyl number of 77, equivalent to a calculated molecular weight of 1470 and an acid number of less than 0.5. A mixture of 1470 parts of this polyester and 331 parts of tolylene diisocyanate isomers (80% 2,4-20% 2,6-) is heated at 100° C. for 45 minutes under nitrogen. The prepolymer has an isocyanato content of 4.35%.

Prepolymer B

About 1 mole of poly(ethylene adipate) glycol having a number average molecular weight of 1840 and 2 moles of methylene-bis(4-phenylisocyanate) are mixed and heated at 100° C. for 45 minutes under nitrogen. The resulting prepolymer has an isocyanato content of 3.54%.

Prepolymer A (100 parts) is mixed at 100° C. with 13.15 parts of 4,4'-methylene-bis(2-chloroaniline), following Procedure C, to form a prior art composition which is cured for 3 hours at 140° C. The pot life of this composition, 20-A-1 is two minutes. A second composition is prepared from Prepolymer A by adding 10 parts of 50% trans-trans methylene-bis(4-cyclohexylisocyanate) to 100 parts of prepolymer and mixing the isocyanate component so formed with 23.39 parts of 4,4'-methylene-bis(2-chloroaniline) at 100° C. following Procedure C. This composition, 20-A-2, is also cured for 3 hours at 140° C. In spite its higher isocyanato group content, which provides a substantial increase in hardness, this composition exhibits a pot life of 2 minutes. After aging for 7 days at 25° C. and 50% relative humidity, Compositions 20-A-1 and 20-A-2 have the following physical properties:

|  | Composition | |
| --- | --- | --- |
|  | 20-A-1 | 20-A-2 |
| $T_B$, p.s.i. (20) | 3,900 | 3,700 |
| $E_B$, percent | 580 | 330 |
| $M_{100}$, p.s.i. | 880 | 2,050 |
| $M_{300}$, p.s.i. | 1,350 | 3,400 |
| Hardness, Shore D | 46 | 62 |
| Split Tear, ASTM D470, p.l.i. | 120 | 170 |

About 100 parts of Prepolymer B is mixed at 80° C. with 10.7 parts of 4,4'-methylene-bis(2-chloroaniline) to form a prior art composition, 20-B-1, which has a pot life of about 2 minutes. Composition 20-B-1 is cured for 4 hours at 120° C. A second composition, 20-B-2, is prepared by adding 15 parts of 50% trans-trans methylene-bis(4-cyclohexylisocyanate) to 100 parts of Prepolymer B. The isocyanate component formed is mixed with 24.88 parts of 4,4'-methylene-bis(2-chloroaniline) at 80° C. following Procedure C and cured for 3 hours at 130° C. The composition has a pot life of about 3 minutes which is greater than that of the prior art composition 20-B-1 and 20-B-2 have the following properties:

|  | Composition | |
| --- | --- | --- |
|  | 20-B-1 | 20-B-2 |
| $T_B$, p.s.i. (20) | 6,000 | 6,100 |
| $E_B$, percent | 680 | 460 |
| $M_{100}$, p.s.i. | 650 | 2,000 |
| $M_{300}$, p.s.i. | 1,260 | 4,000 |
| Hardness, Shore D | 43 | 62 |
| Split Tear, ASTM D470, p.l.i. | 115 | 160 |

EXAMPLE 21

This example illustrates the improved processing characteristics and low shrinkage provided by hard compositions of this invention which are ideally suited for tooling applications.

Thirty pound castings are prepared from three compositions (21-A, 21-B and 21-C) included by the present invention and a prior art control composition (21-D). Heavy cardboard containers measuring 9.75" in diameter and 8.5" in height are used as molds. A calibrated thermocouple connected to a recorder is positioned as closely as possible to the center of the cardboard container so that the temperature of the casting can be measured as curing proceeds. Mixing is carried out on a 15 lb. scale in a 2 gallon pail using a ½ H.P. "Lightening" mixer. Two batches are prepared in immediate sequence to fill the cardboard molds.

The materials used in preparing the castings, processing temperatures and viscosity of the isocyanate component are presented in the following table. The table also includes information on processing characteristics and shrinkage.

|  | 21-A | 21-B | 21-C | 21-D |
|---|---|---|---|---|
| Isocyanate Component: | | | | |
| Prepolymer [a] | 100 | 100 | 100 | 100 |
| Tolylene diisocyanate (80% 2,4-, 21% 2,6-) | | | | 16.5 |
| 50% trans-trans methylene-bis(4-cyclohexylisocyanate) | 25 | 25 | 25 | |
| Amine Component: | | | | |
| 4,4'-methylene-bis(2-chloroaniline) | 43 | 43 | | 41 |
| Diamino-polyurethane/diamine Mixture [b] | | | 86 | |
| Isocyanate Component: | | | | |
| Mixing Temperature, °C | 30 | 40 | 30 | 30 |
| Viscosity, cps. at 30° C | 3,800 | 3,800 | 3,800 | 2,200 |
| Mixing time, min | 2 | 2 | 2 | .3–.5 |
| Working time, min | 20 | 10 | 90 | 2 |
| Critical Gel Time, hrs | 5.5 | 4.5 | 9 | 1.5 |
| Critical Gel Temp., °C | 70 | 94.5 | 26.5 | 133.5 |
| Shrinkage, Estimated, percent | 0.16 | 0.53 | 0.03 | 1.70 |

[a] Reaction product of 2 moles of 2,4-tolylene diisocyanate and 1 mole of polytetramethyleneether glycol, molecular weight 1,000.
[b] Reaction product of a mixture of 1 mole of the bischloroformate of polytetramethyleneether glycol 1,000 and 1.5 moles of the bischloroformate of diethylene glycol with 8.8 moles of 4,4'-methylene-bis(2-chloroaniline) prepared following Procedures A and B, plus additional 4,4'-methylene-bis(2-chloroaniline) to provide an amino nitrogen concentration of 5.25%.

Working time has its usual meaning and represents the time after mixing that a given composition remains sufficiently fluid to flow readily of its own weight. Critical gel time is the time required after casting for a given composition to gel sufficiently so that it is dimensionally stable, even if subjected to oven cure at temperatures above those existing at the critical gel point. It is determined by observation of the resistance of the casting to cutting and denting. The critical gel temperature is the temperature in the center of the casting which exists at the critical gel time. If the casting sets to its final dimensions at an elevated temperature, it will shrink on being cooled to room temperature to a degree which is about proportional to the difference between the critical gel temperature and room temperature. Shrinkage is estimated on the basis of measurements made on castings prepared in an accurately machined mold having a 4" square cross section and a depth of 8".

The data in the table clearly show the advantage provided by the compositions of the present invention over the prior art control composition in regard to all properties. The use of lower processing temperatures to reduce shrinkage is shown by comparing runs 21–A and 21–B.

As many widely different embodiments of this invention may be made without departing from the scope thereof, it is to be understood that this invention is not limited to the specific embodiments thereof except as defined in the appended claims.

I claim:

1. A polyurethane/polyurea prepared by reacting a polyisocyanate component which is:

(a) an organic diisocyanate from the group consisting of 1,4-tetramethylene diisocyanate, 1,6-hexamethylene diisocyanate, 1,10-decamethylene diisocyanate, 1,3-cyclohexylene diisocyanate, 1,4-cyclohexylene diisocyanate, methylene-bis(4-cyclohexylisocyanate), 1,3-xylylene diisocyanate, $\alpha,\alpha,\alpha',\alpha'$-tetramethyl-1,3-xylylene diisocyanate, 1,4-xylylene diisocyanate, 4-isocyanatobenzyl isocyanate, 2,2'-diisocyanatodiethyl carbonate, tolylene-2,4-diisocyanate, tolylene-2,6-diisocyanate, methylenebis(4-phenylisocyanate) and its alkyl, and alkoxy substituted derivatives, 1,3-phenylene diisocyanate, 1,4-phenylene diisocyanate and mixtures thereof;

(b) an isocyanato-terminated prepolymer prepared by reacting any of the above-described organic polyisocyanates with at least one polyol from the group consisting of butanediol-1,3, butanediol-1,4, diethylene glycol, dipropylene glycol, neopentyl glycol, cyclohexanediol-1,4, polyalkyleneether glycols, and polyester glycols; or (c) mixtures of (a) and (b);

with a diamine component in an amount sufficient to provide 0.7 to 1.1 amino groups for each isocyanato group, said diamine being:

(d) an organic diamine the amino groups of which are attached to an aromatic nucleus and positioned ortho to a hindering Cl, Br, F, $CF_3$, or $NO_2$ substituent, said diamine being from the group consisting of phenylene diamines; diamines of the formula

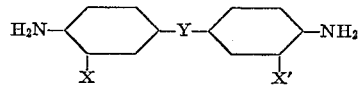

wherein X and X' are independently the hindering substituents described above and Y is —$CH_2$—, —O—, —S—, —S—S,

lower alkylene, phenylene, or Y is omitted so that the phenyl radicals are joined together to yield a biphenyl derivative; substituted derivatives of the diamines corresponding to the formula given above wherein the substituents are alkyl, aryl, alkoxy, aryloxy, alkenyl or those represented by X; 2,6-dichloro-1,5-diaminonaphthalene; 2,3-dichloro-1,4-diaminophthalene; and 5,6-dichloro-4,7-diaminobenzofuran;

(e) a diaminopolyurethane of the formula

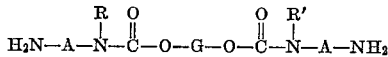

wherein —G— is the residue resulting from the removal of the hydroxy groups from a glycol from the group consisting of butanediol-1,3, butanediol-1,4, neopentyl glycol, hexanediol-1,6, cyclohexanediol-1,4, decamethylene glycol, diethylene glycol, polyalkyleneether glycols, and polyester glycols, and —A— is the residue resulting from removal of the amino groups from an aromatic diamine selected such that the terminal amino groups of the above formula are positioned ortho to a hindering Cl, Br, F, $CF_3$, or $NO_2$ substituent, and R and R' are independently hydrogen or lower alkyl; or (f) mixtures of (d) and (e);

with the further provisos that (1) at least 5% of the isocyanato group of said polyisocyanate component are attached to aliphatic radicals, cycloaliphatic radicals or mixtures thereof, and (2) sufficient glycol residue is present in said polyurethane/polyurea polymer to give the units between urea groups a number average molecular weight of from 250 to 2500.

2. A polyurethane/polyurea of claim 1 wherein the aliphatic isocyanato groups are provided by at least one diisocyanate from the group consisting of 1,6-hexamethylene diisocyanate and methylenebis(4-cyclohexyl isocyanate).

3. A polyurethane/polyurea of claim 1 wherein the diamine component is 4,4'-methylenebis(2-chloroaniline).

4. A polyurethane/polyurea of claim 1 wherein the diamine component is an amino-terminated polyurethane of the formula given in claim 1 wherein —G— is the residue remaining after removal of both hydroxy groups from polytetramethyleneether glycol.

5. A polyurethane/polyurea of claim 1 wherein said polyisocyanate component is a mixture of (i) diisocyanates from the group consisting of aliphatic diisocyanates, cycloaliphatic diisocyanates and mixtures thereof, and (ii) a prepolymer prepared by reacting a glycol and at least 1.4 moles per mole of glycol of a diisocyanate from the group consisting of aliphatic diisocyanates, cycloaliphatic diisocyanates, aromatic diisocyanates and mixtures thereof.

6. A polyurethane/polyurea of claim 5 wherein the polyisocyanate component is a mixture of methylenebis(4-cyclohexyl isocyanate) and a prepolymer which is the reaction product of a glycol and at least 1.4 moles per mole of said glycol of a diisocyanate from the group consisting of tolylene diisocyanate, methylenebis(4-cyclohexyl isocyanate), and mixtures thereof.

7. A polyurethane/polyurea of claim 3 wherein the polyisocyanate component is a mixture of methylenebis(4-cyclohexyl isocyanate) and a prepolymer which is the reaction product of polytetramethyleneether glycol, about 0–1 mole of a low molecular weight glycol from the group consisting of butanediol-1,3, butanediol-1,4, diethylene glycol and mixtures thereof and about 1.4–2.0 moles of tolylene diisocyanate per mole of glycol.

8. A polyurethane/polyurea of claim 7 wherein the diamine component is 4,4'-methylenebis(2-chloroaniline).

9. A polyurethane/polyurea of claim 7 wherein the diamine component is an amino-terminated polyurethane as described in claim 1 in which —G— is the residue remaining after removal of both hydroxy groups from polytetramethyleneether glycol.

10. A polyurethane/polyurea of claim 1 wherein the polyisocyanate component is from the group consisting of aliphatic diisocyanates, cycloaliphatic diisocyanates and mixtures thereof.

11. A polyurethane/polyurea polymer of claim 1 wherein the polyisocyanate component and diamine component are reacted in proportions such that there are from about 0.9–1.0 amino groups per isocyanato group present.

12. A polyurethane/polyurea tooling composition prepared by reacting
 (A) 4,4'-methylenebis(2-chloroaniline) with about
 (B) an equivalent amount of a mixture consisting essentially of
  (a) 10 to 30 parts by weight of 4,4'-methylenebis(4-cyclohexyl isocyanate) and
  (b) 90 to 70 parts by weight of a prepolymer prepared by reacting
   (1) polytetramethyleneether glycol (1000) which contains from 0 to an equal molar amount of a glycol selected from the group consisting of diethylene glycol, 1,3-butanediol, and 1,4-butanediol, with
   (2) about 2 moles per mole of total glycol of diisocyanate consisting of 2,4-tolylene diisocyanate containing from 0–35% by weight of 2,6-tolylene diisocyanate
and obtaining as a result thereof said tooling composition.

13. A polyurethane/polyurea tooling composition prepared by reacting
 (A) a mixture of 4,4'-methylenebis(2-chloroaniline) and a diamino-polyurethane prepared by reacting
  (a) the mixed bischloroformates of 1 molar proportion of polytetramethyleneether glycol (1000) and 1.5 molar proportions of diethylene glycol, with
  (b) an excess of 4,4'-methylenebis(2-chloroaniline), with
 (B) about an equivalent amount of diisocyanate consisting of 4,4'-methylenebis(cyclohexyl isocyanate) containing from 0 to 50% by weight of a prepolymer prepared by reacting
  (1) polytetramethyleneether glycol (1000) which contains from 0 to an equal molar amount of a glycol selected from the group consisting of diethylene glycol, 1,3-butanediol, and 1,4-butanediol, with
  (2) about 2 moles per mole of total glycol of diisocyanate consisting of 2,4-tolylene diisocyanate containing from 0–35% by weight of 2,6-tolylene diisocyanate
and obtaining as a result thereof said tooling composition.

References Cited
UNITED STATES PATENTS

| | | | |
|---|---|---|---|
| 2,888,439 | 5/1959 | Simons | 260—77.5 |
| 3,036,996 | 5/1962 | Kogon | 260—77.5 |

MURRAY TILLMAN, Primary Examiner

PAUL LIEBERMAN, Assistant Examiner

U.S. Cl. X.R.

260—37, 47, 49, 75, 77.5